Patented Oct. 15, 1940

2,218,247

UNITED STATES PATENT OFFICE 2,218,247

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application December 29, 1937, Serial No. 182,302

13 Claims. (Cl. 8—50)

This invention relates to the art of dyeing or coloring. More particularly, it relates to the dyeing or coloring of organic derivatives of cellulose with non-sulfonated aryl azo dye compounds. The invention includes the azo dye compounds, the process for their preparation, the process of coloring with them and materials colored with the azo dye compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aryl azo dye compounds can be obtained by coupling non-sulfonated aryl diazonium salts with compounds of the type represented by the formula:

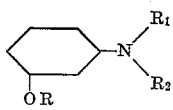

wherein R, R₁ and R₂ each represent a member selected from the class consisting of an alkyl group and a hydroxyalkyl group.

The alkyl group in the above formula may be methyl, ethyl, a propyl or a butyl group, for example. Similarly, the hydroxyalkyl group may be hydroxyethyl, dioxypropyl, oxypropyl or γ-alkoxy-β-oxypropyl, for example.

The compounds of our invention have the probable formula:

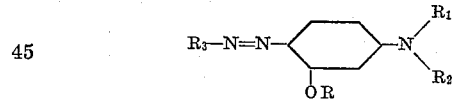

wherein R, R₁ and R₂ have the meaning above given and R₃ represents a non-sulfonated aryl nucleus. Advantageously, R₃ is an aryl nucleus of the benzene series.

The non-sulfonated aryl azo compounds of our invention constitute valuable dyes which may be employed for the dyeing or coloration of materials made of or containing organic derivatives of cellulose. The dyeings produced employing said non-sulfonated aryl azo compounds are, in general, of good fastness to light and washing and range in shade from yellow to purple.

The following examples illustrate the method of preparation of the azo compounds of our invention:

Example 1

16.8 grams of 1-amino-2-methoxy-4-nitrobenzene are dissolved in 40 cc. of sulfuric acid (specific gravity 1.84) and 100 grams of water and ice are added with vigorous stirring. If necessary, more ice may be added to cool the mixture to a temperature of 5–10° C. The suspended amine sulfate is then diazotized by adding, with stirring, a concentrated water solution of 6.9 grams of sodium nitrite.

19.3 grams of 1-diethylamino-3-ethoxybenzene are dissolved in 100 cc. of glacial acetic acid and the resulting mixture is cooled to a temperature approximating 5-10° C. Cooling may be effected, for example, by the addition of ice. The diazo solution prepared above is then slowly added with stirring, while maintaining a temperature of 5–10° C., and following its addition, the solution is neutralized to Congo red paper by the addition of sodium acetate. When the coupling reaction is complete, the acetic acid is removed by steam distillation and the precipitated purple colored dye compound is recovered by filtration, washed with water and dried. The dye compound formed has the formula:

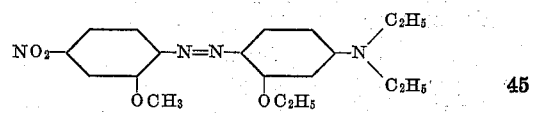

and colors cellulose acetate silk a deep bluish-red shade of excellent fastness to light from an aqueous suspension.

Example 2

16.8 grams of 1-amino-2-nitro-4-methoxybenzene are dissolved in 40 cc. of sulfuric acid (specific gravity 1.84) and 100 grams of water and ice are added with vigorous stirring. The resulting solution is then diazotized, while maintaining a temperature of 5–10° C. by adding, with stirring, a concentrated water solution of 6.9 grams of sodium nitrite.

16.5 grams of 1-dimethylamino-3-ethoxybenzene are dissolved in 100 cc. of glacial acetic acid. The resulting solution is then cooled to a temperature approximating 5–10° C. and the diazo solution prepared as described above is added with stirring. The coupling reaction is carried out at a temperature of about 5–10° C. Upon complete addition of the diazo solution, the resulting mixture is neutralized to Congo red paper by the addition of sodium acetate. When the coupling reaction is complete, the acetic acid present is removed by steam distillation and the precipitated dark brown dye compound is recovered by filtration, washed with water and dried. The dye compound formed has the formula:

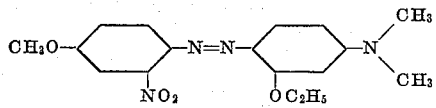

and colors cellulose acetate silk a deep tan shade from an aqueous suspension.

Example 3

13.8 grams of 1-amino-4-nitrobenzene are dissolved in 40 cc. of sulfuric acid (specific gravity 1.84) and 100 grams of water and ice are added with vigorous stirring. If the temperature of the resulting mixture is not approximately 5–10° C., more ice may be added to cool it to this temperature. The suspended amine sulfate is then diazotized in the usual manner by adding, with stirring, a concentrated water solution of 6.9 grams of sodium nitrite.

21.1 grams of 1-di-β-hydroxyethylamino-3-methoxybenzene are dissolved in 100 cc. of glacial acetic acid. The resulting solution is cooled to a temperature approximating 5–10° C. and the diazo solution prepared as described above is then added with stirring, the temperature being maintained at 5–10° C. throughout the coupling reaction which occurs. Upon complete addition of the diazo solution, the resulting mixture is neutralized to Congo red paper by the addition of sodium acetate. When the coupling reaction is complete, the acetic acid present in the reaction mixture is removed by steam distillation and the precipitated dye compound formed is recovered by filtration, washed with water and dried. The dye compound formed has the formula:

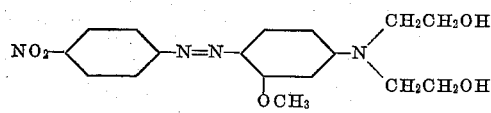

and colors cellulose acetate silk a deep red shade from an aqueous suspension.

Example 4

19.7 grams of p-aminoazobenzene are suspended in 300 cc. of water and 40 cc. of 36% hydrochloric acid. The resulting mixture is cooled to a temperature approximating 20° C. and diazotized in the usual manner by adding, with stirring, a concentrated water solution of 6.9 grams of sodium nitrite while maintaining said temperature.

27 grams of diglyceryl-m-anisidine are dissolved in a cold dilute hydrochloric acid solution and the diazo solution formed above is slowly added, with stirring, while maintaining the mixture in a cooled condition. Following the addition of the diazo solution, the mixture resulting is neutralized to Congo red paper by the addition of sodium acetate. Upon completion of the coupling reaction which takes place, the precipitated dye compound formed is recovered by filtration, washed with water and dried. The dye compound formed has the formula:

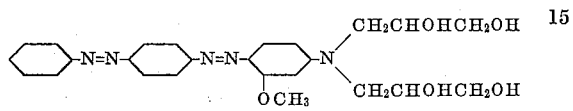

and colors cellulose acetate silk red from an aqueous suspension.

In order that our invention may be fully understood, the preparation of a number of coupling components employed in the preparation of the azo compounds of our invention is disclosed hereinafter.

Preparation of di-glyceryl-m-anisidine 62 gm. of m-anisidine, 141 gm. of glyceryl monochlorohydrin and 67 gm. of Na₂CO₃ were weighed into a one liter flask and heated on an oil bath at 140° C. for 13 hours with constant stirring. At the end of eight hours on the oil bath, 27 gm. of glyceryl monochlorohydrin and 15 gm. of Na₂CO₃ were added and heating continued with stirring as above described. The product obtained was fairly water-soluble and was concentrated by vacuum while heating on a steam bath. The resulting crystals obtained were filtered and the concentration treatment repeated, following which the crystals were again filtered. The crude product obtained was vacuum distilled to yield 60 gm. of di-glyceryl-m-anisidine having a boiling point of 235–250° C. under a pressure of 2 mm. Some mono-glyceryl-m-anisidine having a boiling point of 185–190° C. under a pressure of 2 mm. is likewise obtained by this vacuum distillation.

Preparation of m-β-hydroxyethoxy dimethylaniline 153 gm. of m-β-hydroxyethoxyaniline and 110 grams of sodium carbonate are placed in a flask fitted with a stirrer and condenser. 300 gm. of methyl iodide are then added dropwise with stirring at the boiling point of methyl iodide over a period of two hours. Heating is continued with stirring for two hours after complete addition of the methyl iodide. The reaction product is extracted with ethyl alcohol, following which the alcohol is removed by distillation and the residue purified by distillation under reduced pressure. The purified residue is m-β-hydroxyethoxy dimethylaniline and is obtained in an excellent yield.

The following tabulation further illustrates the compounds included within the scope of our invention, together with the color they produce on cellulose acetate silk. The compounds indicated below may be prepared by diazotizing the amines listed under the heading "Amine" and coupling with the compounds specified in the column entitled "Coupling component." The diazotization and coupling reactions may, for example, be carried out following the general procedure described in Examples 1 to 4, inclusive.

| Amine | Coupling component | Color on cellulose acetate silk |
|---|---|---|
| p-Nitroaniline | 2-ethoxy-N,N-diethylaniline (structure: benzene ring with OC₂H₅ and N(C₂H₅)₂) | Claret red. |
| o-Nitroaniline | do | Orange red. |
| 1-amino-2-nitro-4-methylbenzene | do | Orange. |
| 1-amino-2-methyl-5-nitrobenzene | do | Orange yellow. |
| 1-amino-2-methoxy-4-nitrobenzene | do | Red. |
| 1-amino-3-acetamino benzene | do | Orange. |
| p-Aminobenzyl alcohol | do | Orange. |
| 1-amino-2-methyl-4-nitrobenzene | do | Pink. |
| 1-amino-2-chloro-4-nitrobenzene | do | Rubine. |
| 1-amino-2-nitro-4-methoxybenzene | 2-ethoxy-N,N-diethylaniline (structure with OC₂H₅ and N(C₂H₅)₂) | Tan. |
| 1-amino-2-chloro-4-nitrobenzene | 2-methoxy-N,N-dimethylaniline (structure with OCH₃ and N(CH₃)₂) | Rubine. |
| 1-amino-2-nitro-4-chlorobenzene | do | Orange red. |
| 1-amino-2-methoxy-benzene | do | Yellow. |
| p-Nitroaniline | 2-(β-hydroxyethoxy)-N,N-di(β-hydroxyethyl)aniline (structure with OCH₂CH₂OH and N(CH₂CH₂OH)₂) | Red. |
| 1-amino-2,4,6-trinitrobenzene | do | Purple. |
| 1-amino-2-bromo-4-nitrobenzene | do | Rubine. |
| 2-nitro-α-naphthylamine | do | Reddish purple. |
| 1-amino-2,4-dinitro-6-bromobenzene | 2-methoxy-N,N-di(β-hydroxyethyl)aniline (structure with OCH₃ and N(CH₂CH₂OH)₂) | Violet. |
| 1-amino-2-bromo-4-nitrobenzene | do | Rubine. |
| p-Nitroaniline | 2-methoxy-N-ethyl-N-(β-hydroxyethyl)aniline (structure with OCH₃ and N(CH₂CH₃)(CH₂CH₂OH)) | Red. |
| p-Aminoacetophenone | 2-butoxy-N-(glyceryl)-N-(glyceryl methyl ether)aniline (structure with OC₄H₉ and N(CH₂CHOHCH₂OH)(CH₂CHOHCH₂OCH₃)) | Orange. |
| Do | 2-(β-hydroxyethoxy)-N,N-dimethylaniline (structure with OCH₂CH₂OH and N(CH₃)₂) | Do. |
| o-Chloroaniline | Di-β-hydroxyethyl-m-anisidine | Yellow. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| 1-amino-2-methoxy-5-chlorobenzene | Di-β-Hydroxyethyl-m-anisidine | Orange yellow. |
| Do | Di-β-Hydroxyethyl-m-phenetidine | Do. |
| Do | Di-glyceryl-m-phenetidine | Do. |
| Do | m-β-Hydroxyethoxy dimethylaniline | Do. |
| 1-amino-2-methyl-4-chlorobenzene | Di-β-Hydroxyethyl-m-anisidine | Yellow. |
| Do | Di-β-Hydroxyethyl-m-phenetidine | Do. |
| Do | Di-glyceryl-m-phenetidine | Do. |
| Do | m-β-Hydroxyethoxy dimethylaniline | Do. |
| 1-amino-2-(F, Cl, Br)-4-nitrobenzene | Di-β-hydroxyethyl-m-anisidine | Rubine. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| 1-amino-2,4-dinitro-benzene | Di-β-hydroxyethyl-m-anisidine | Violet. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| 1-amino-2,4-dinitro-6-(F, Cl, Br) benzene | Di-β-hydroxyethyl-m-anisidine | Purple. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| p-Aminoazobenzene | Di-β-hydroxyethyl-m-anisidine | Rubine. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| p-Aminoacetophenone | Di-β-hydroxyethyl-m-anisidine | Orange. |
| Do | Di-β-hydroxyethyl-m-phenetidine | Do. |
| Do | Di-glyceryl-m-phenetidine | Do. |
| Do | m-β-Hydroxyethoxy dimethylaniline | Do. |
| 1-amino-2-hydroxy-4-benzene | Dimethyl-m-methoxy aniline | Pink-red. |
| Do | Di-β-hydroxyethyl-m-propoxy-aniline | Do. |
| Do | Butyl sulfoethyl-m-anisidine | Do. |

In order that the application of the compounds of our invention may be clearly understood, their application for the direct dyeing or coloration of materials made of or containing an organic derivative of cellulose, and more particularly cellulose acetate silk, is described hereinafter.

In employing the aryl azo derivatives of our invention as dyes, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye-bath will be raised to that selected for carrying out the dyeing operation. The temperature at which the dyeing is conducted will vary somewhat, depending for example on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations, when a dispersing agent is to be employed, preferably it is neutral or substantially neutral.

It will be understood that the azo compounds of our invention may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, salts of sulphoricinoleic acid, a water-soluble salt of cellulose phthalate, cellulose succinate or cellulose monoacetate diphthalate, for example, the sodium, potassium or ammonium salts, and sulfonated oleic, stearic or palmitic acid, or salts thereof, such for example as the sodium or ammonium salts.

While it is preferred to effect coloration by applying the dye compound from an aqueous dyebath directly to the material to be colored, coloration may be effected, for example, by absorbing and diazotizing an amine on the fiber after which the dye is formed in situ by coupling with a coupling component such as di-β-hydroxyethyl-m-anisidine or ethyl-β-hydroxyethyl-m-anisidine, for example.

The following examples illustrate how dyeing may be carried out in accordance with our invention. Quantities are expressed in parts by weight.

*Example A*

2.5 parts of

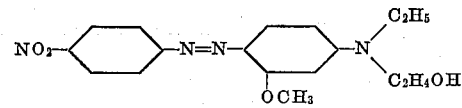

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a red shade of good fastness to light.

*Example B*

2.5 parts of

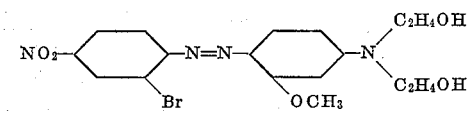

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath, after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a rubine color of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk, or by employing dye compounds other than those employed in the example, or by substitution of both the material being dyed and the dye compounds of the examples.

We claim:

1. An azo compound having the formula:

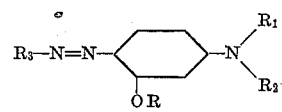

wherein R, $R_1$ and $R_2$ each represent a member selected from the group consisting of an alkyl group and a hydroxyalkyl group and $R_3$ represents a non-sulfonated aryl nucleus selected from the group consisting of an aryl nucleus of the benzene series and an aryl nucleus of the naphthalene series.

2. An azo compound having the formula:

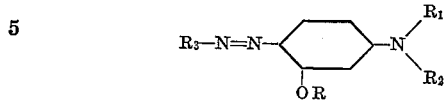

wherein R, $R_1$ and $R_2$ each represent a member selected from the group consisting of an alkyl group and a hydroxyalkyl group and $R_3$ represents a non-sulfonated aryl nucleus of the benzene series.

3. An azo compound having the formula:

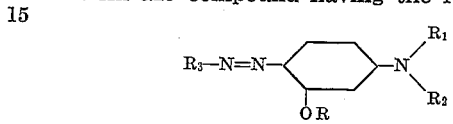

wherein R represents an alkyl group, $R_1$ and $R_2$ each represent a member selected from the group consisting of an alkyl group and a hydroxyalkyl group and $R_3$ represents a non-sulfonated aryl nucleus of the benzene series.

4. An azo compound having the formula:

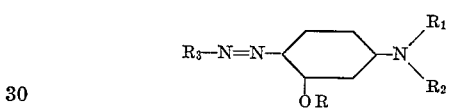

wherein R represents a hydroxyalkyl group, $R_1$ and $R_2$ each represent a member selected from the group consisting of an alkyl group and a hydroxyalkyl group and $R_3$ represents a non-sulfonated aryl nucleus of the benzene series.

5. The azo compound having the formula:

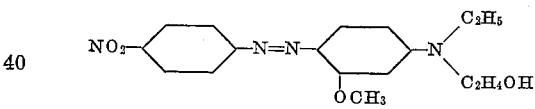

6. The azo compound having the formula:

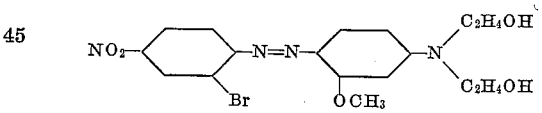

7. The azo compound having the formula:

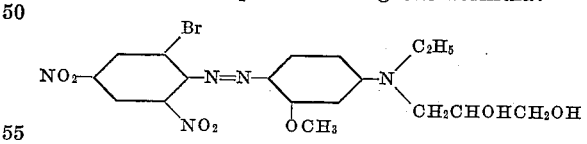

8. The process of coloring material made of or containing an organic derivative of cellulose which comprises applying thereto a dye selected from the class of azo compounds having the general formula:

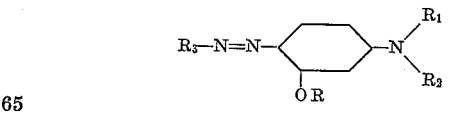

wherein R, $R_1$ and $R_2$ each represent a member selected from the group consisting of an alkyl group and a hydroxyalkyl group and $R_3$ represents a non-sulfonated aryl nucleus selected from the group consisting of an aryl nucleus of the benzene series and an aryl nucleus of the naphthalene series.

9. The process of coloring material made of or containing an organic derivative of cellulose which comprises applying thereto a dye selected from the class of azo compounds having the general formula:

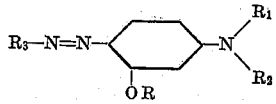

wherein R, $R_1$ and $R_2$ each represent a member selected from the group consisting of an alkyl group and a hydroxyalkyl group and $R_3$ represents a non-sulfonated aryl nucleus of the benzene series.

10. The process of coloring material made of or containing an organic acid ester of cellulose which comprises applying thereto a dye selected from the class of azo compounds having the general formula:

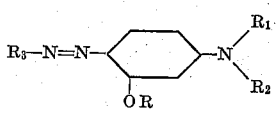

wherein R, $R_1$ and $R_2$ each represent a member selected from the group consisting of an alkyl group and a hydroxyalkyl group and $R_3$ represents a non-sulfonated aryl nucleus selected from the group consisting of an aryl nucleus of the benzene series and an aryl nucleus of the naphthalene series.

11. The process of coloring material made of or containing an organic acid ester of cellulose which comprises applying thereto a dye selected from the class of azo compounds having the general formula:

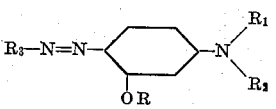

wherein R, $R_1$ and $R_2$ each represent a member selected from the group consisting of an alkyl group and a hydroxyalkyl group and $R_3$ represents a non-sulfonated aryl nucleus of the benzene series.

12. The process of coloring a cellulose acetate which comprises applying thereto a dye selected from the class of azo compounds having the general formula:

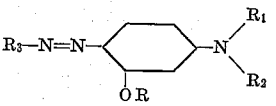

wherein R, $R_1$ and $R_2$ each represent a member selected from the group consisting of an alkyl group and a hydroxyalkyl group and $R_3$ represents a non-sulfonated aryl nucleus selected from the group consisting of an aryl nucleus of the benzene series and an aryl nucleus of the naphthalene series.

13. A cellulose acetate colored with a dye selected from the class of azo compounds having the general formula:

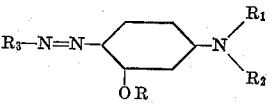

wherein R, $R_1$ and $R_2$ each represent a member selected from the group consisting of an alkyl group and a hydroxyalkyl group and $R_3$ represents a non-sulfonated aryl nucleus of the benzene series.

JAMES G. McNALLY.
JOSEPH B. DICKEY.